United States Patent

[11] 3,554,558

[72] Inventor  Gundolf Rajakovics
              Kapfenberg, Austria
[21] Appl. No. 731,750
[22] Filed     May 24, 1968
[45] Patented  Jan. 12, 1971
[73] Assignee  Gebr. Bohler & Co. Aktiengesellschaft
               Vienna, Austria

[54] SEALED JOINT
     17 Claims, 2 Drawing Figs.
[52] U.S. Cl. .................................................... 277/18,
              277/22, 277/135; 137/248; 251/214
[51] Int. Cl. ........................................................ F16j 15/00,
                                                                F16j 15/40
[50] Field of Search ............................................ 277/18,
              135, 26, 22; 251/214; 137/248, 341, 338

[56]              References Cited
              UNITED STATES PATENTS
2,945,504  7/1960  Bredtschneider et al. .....  137/248X
3,097,662  7/1963  Peters .............................  137/338
3,098,497  7/1963  Glasgow et al. ...............  137/248X
3,117,792  1/1964  Glenn et al. ...................  277/26X
3,129,947  4/1964  Streck ............................  277/22

Primary Examiner—Samuel B. Rothberg
Attorney—Glascock, Downing & Seebold

ABSTRACT: A movable machine element extends through a housing and defines a gap therewith. A supply line communicates with the gap at an intermediate point of the length thereof and is adapted to supply liquid sealing fluid to the gap. Cooling means are provided to cool the sealing fluid in the gap below its solidification point on both sides of the intermediate point.

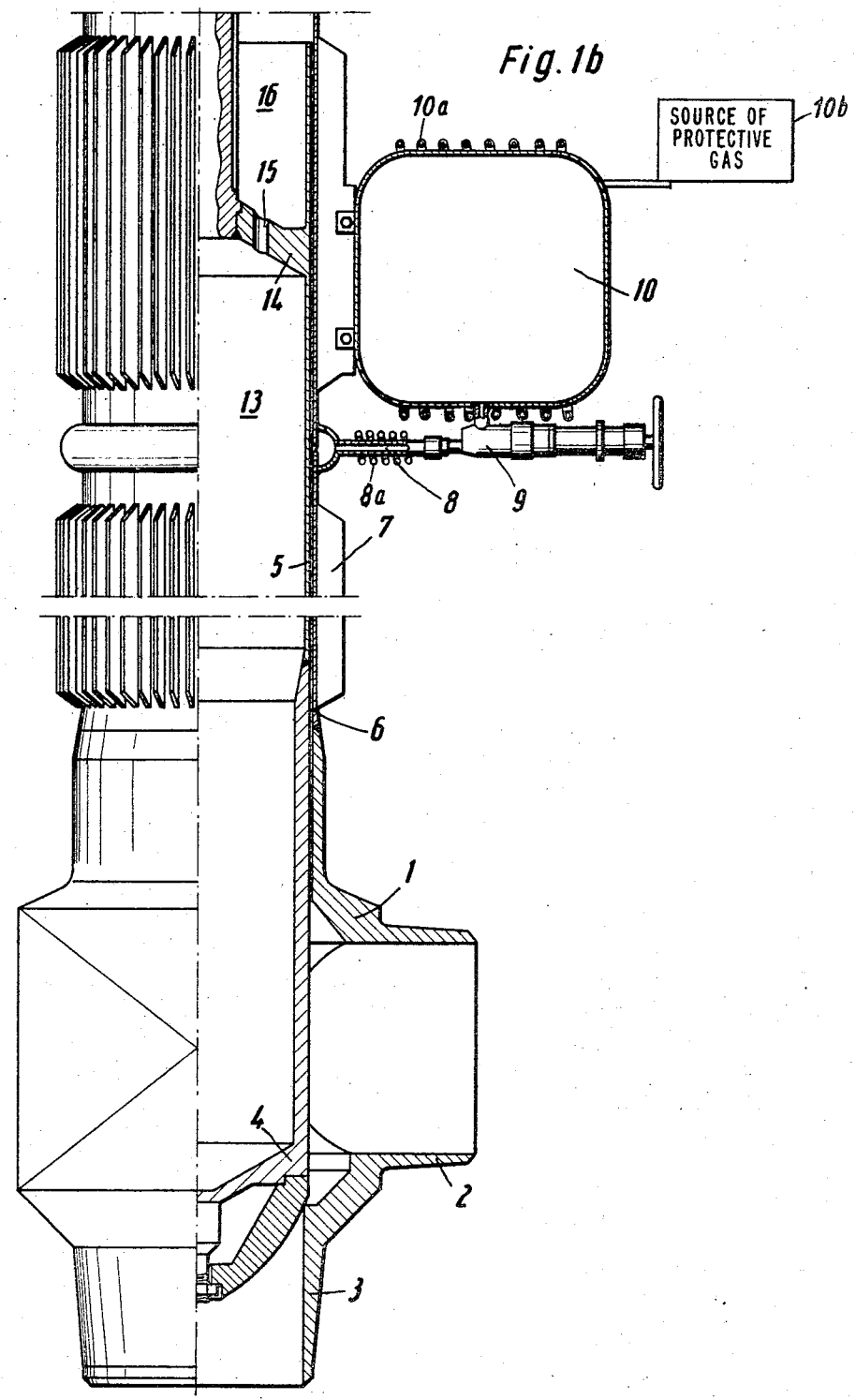

SEALED JOINT

BACKGROUND OF THE INVENTION

This invention relates to the sealing of a gap between a movable machine element, such as a valve stem, a control rod or the like, and a housing or a guide bushing in accordance with the principle of the known frozen gland.

In the known frozen gland, a hot operating fluid, such as sodium, is forced under the operating pressure into a clearance or gap existing between a movable machine element and a housing or guide bushing, which housing or guide bushing is cooled from the outside in this region. The operating fluid in the gap is thus cooled in the axial direction of the machine element and may partly reach the solidification point if the length of the gap is properly selected. While the gap is open toward the outside, the operating fluid can flow in the gap only as long as it remains liquid. As soon as the operating fluid solidifies, it forms a seal to prevent a further flow or escape of further liquid and seals the moving machine element to the housing.

Such known seals or frozen glands have various disadvantages. To ensure a good seal, the solidification temperature of the operating fluid must lie between the operating temperature and the lowest temperature of the housing. To minimize the sealing surfaces, the cross section of the movable machine element is also selected to be as small as possible at the seam. For instance, the valve stem, is in most cases, much smaller in diameter than the valve member. To move the movable machine element, e.g., the valve, to its operating position, the housing or guide bushing must be separable from the hollow body which contains the sealing fluid, e.g., from a pipeline or a valve housing, and the separation must be provided for in a surface in which the operating temperatures are high in most cases. A direct flange connection of the housing or guide bushing to the hollow body is difficult or requires complicated connecting means.

Such glands can be used, e.g., in plants in which alkali metals are used as operating fluids. If such plant is entirely or partly emptied, contraction cracks will form even in such a solidified seal consisting of the operating fluid, or the seal will detach from the walls of the gap to be sealed. In such case or before the first filling of the plant with operating fluid it will not be possible to evacuate the plant.

In such case it is also impossible to form the seal from a substance other than the operating fluid because only the latter can replenish the seal and fill any contraction cracks formed upon the solidification. These facts highly restrict the field of application of such seals.

SUMMARY OF THE INVENTION

For this reason, it is suggested according to the invention that the sealing fluid be separately supplied to the gap to be sealed and that the gap be designed to enable a uniform distribution of liquid sealing fluid toward the part of the plant which is filled with operating fluid and toward the environment of the plant and a solidification of the sealing fluid at a suitable distance from its point of supply as a result or a proper cooling of the walls which define the space.

To this end, the sealing fluid must be kept in a liquid state and desirably under a superatmospheric pressure and suitably under a protective gas atmosphere in a separate reservoir, which may constitute an expansion vessel. The supply line and reservoir may be heated or provided with heat insulation next to the point of supply so that the sealing agent is reliably maintained in a liquid state at this point.

On both sides of the supply line for the sealing fluid, the walls defining the gap are provided with cooling means, e.g., with cooling fins or a coolant circulation path between double walls or the like.

The movable machine element, e.g., the valve stem, may be hollow and filled with cooling or heat-insulating material.

Adjacent to the seal, the movable machine element is usually smaller in diameter than in the gap filled by the operating fluid. To improve the seal, the movable machine element may be as large in diameter adjacent to the seal as outside the region or larger.

The gland according to the invention has the advantage of preventing an escape of the sealing fluid not only to the environment of the plant but also into the interior of the plant so that the operating and sealing fluids may be different substances, provided that they are adequately compatible under the conditions which prevail at the point of contact. Moreover, the operating temperature is highly independent of the solidification point of the sealing fluid. Another advantage resides in that such seal is effective even before the plant is filled with operating fluid or when the latter has been drained so that such plants can be evacuated before they are put into operation. It is sufficient to heat the seal, the supply line and the reservoir as well as the sealing fluid contained therein to a temperature at which the sealing fluid is liquid and can fill the gap to be sealed, and to cool at those points where the sealing agent is to be solidified.

The subject matter of the invention will be explained with reference to an embodiment which is shown by way of example in the drawing in the form of an angle valve for controlling liquid sodium, such as is used to cool nuclear reactors.

BRIEF DESCRIPTION OF THE DRAWINGS

FIG. 1a is a sectional view showing the upper part of the valve with the actuating motor and FIG. 1b is a sectional view showing the valve chamber and the stem-sealing chamber.

DETAILED DESCRIPTION OF THE INVENTION

Figure 1A:
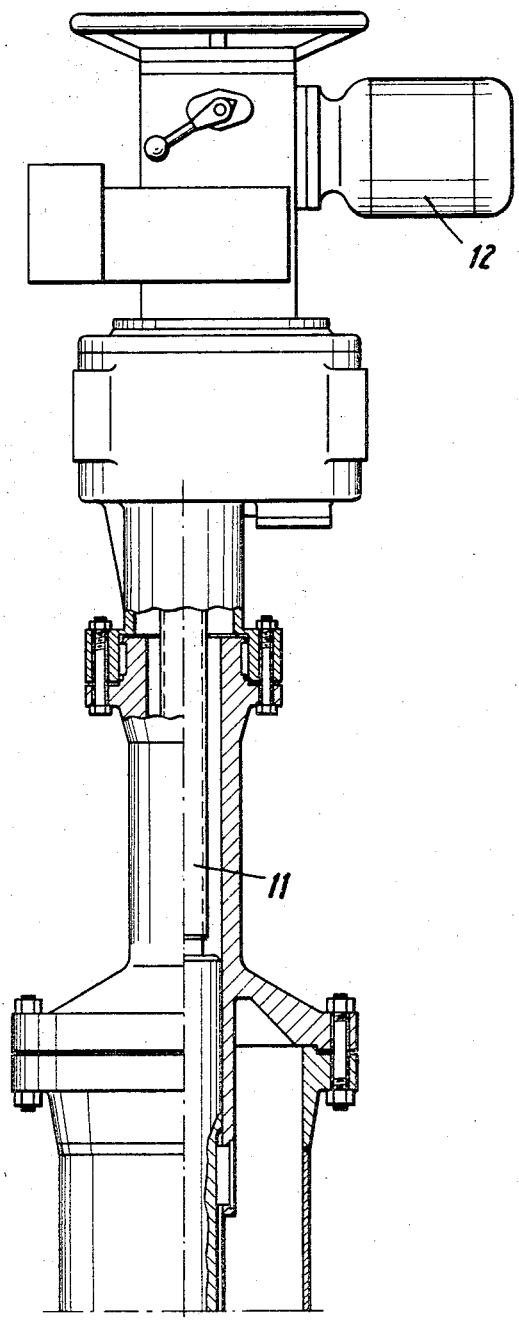

A valve housing 1 has an inlet connection pipe 3 and an outlet connection pipe 2. A valve member 4 is contained in the housing and provided with a valve stem 5, which is as large in diameter as the valve member or larger. This valve housing and the valve stem, which is axially movable in the housing, are designed to form a gland which prevents an escape of the fluid to be controlled by the valve. A gap 6 between the valve housing and stem is filled with liquid sodium as a sealing fluid. The intermediate portion of the sealed gap is connected by a supply line 8 and a shutoff valve 9 to a reservoir 10, which contains an adequate quantity of the sealing fluid. Before and during the operation of the valve, the sealing fluid is maintained in a liquid state and is fed to the sealed gap. A guide bushing comprises a portion 13, which extends from the supply line toward the valve member 4, and a portion 16, which extends from the supply line toward a drive motor 12. The portions 13 and 16 are provided with cooling fins 7. The sealing fluid which flows from the supply line in the gap 6 in both directions is solidified as a result of the cooling action of the cooling fins in the portion 13 and 16 of the guide bushing to form a tight seal toward the interior of the valve housing 1 and toward the actuating side. The latter housing may be additionally sealed with a safety stuffing box.

Means such as heating coils 10a and 8 a may be provided, if desired, which serve to heat the reservoir 10 and the supply line 8 respectively and to maintain a protective gas atmosphere in the reservoir a source of protective gas 10b communicates therewith via line 10c. The protective gas atmosphere may be under superatmospheric pressure.

It is also apparent from FIG. 1b that the valve stem 5 is as large in diameter as the valve member 4 so that it is not necessary to separate the valve housing from the adjoining operating cavity. When the actuating part has been removed, the valve member and valve stem can be inserted from above as far as to the valve seat. This valve stem which is large in diameter is connected to a screw 11, which is smaller in diameter. The stem 5 and the screw 11 are connected by a ring 14, which is provided with a bore 15. The actuating motor 12 is connected to the top of the screw 11.

To seal the axially movable valve stem, the gap 6 between the valve stem 5 and the housing 1 is filled with liquid sodium.

The cooling action of the cooling fins 7 causes the liquid sodium to solidify in the two portions 13 and 16 above and below the supply line. Changes in the operating conditions or stoppages may cause the sealing fluid to cool further and contract. The clearances which are thus opened are filled from the reservoir 10, which is connected to the sealed gap and serves as an expansion vessel. In the above-mentioned cases, the sealing fluid is replenished to fill the clearance which has been opened by the contraction and to prevent a trapping of air.

In order to enhance the cooling action of the fins, the valve stem is not much smaller in diameter than the valve member, as is usual in stuffing boxes, but is as large in diameter as the valve member or larger. The valve stem consists suitably of a hollow cylinder. This design and dimensioning of the valve stem affords the additional advantage that the valve and gland are simplified in structure. The axial cavity 13 in the stem may be filled with heat-insulating material in order to reduce the convective heat transfer in the interior of the stem.

The design of the valve according to the invention is suitable not only for use with sealing fluids such as potassium or sodium but also for other metals, such as tin. The fluid to be controlled need not be the same as the sealing fluid. On the contrary, it may be desirable to use the proposed sealing fluid in valves for controlling a fluid other than the sealing fluid, provided that the sealing fluid is compatible, particularly chemically compatible, with the operating fluid.

A safety stuffing box of the usual and known kind may be connected to the frozen gland and may be provided with a leakage indicator.

I claim:

1. A sealed joint, comprising:
   a housing;
   a movable machine element extending through said housing and defining a gap between the outer periphery of said element and the inner periphery of the housing;
   a supply line communicating with said gap at an intermediate point of the length thereof and with a source of liquid-sealing fluid adapted to supply liquid-sealing fluid to said gap; and
   cooling means for the housing in proximity to the gap for cooling said sealing fluid in said gap below its solidification point on both sides of said intermediate point.

2. The sealed joint as claimed in claim 1, which further comprises means for maintaining said sealing fluid in said source under superatmospheric pressure.

3. The sealed joint as claimed in claim 1, which further comprises means for maintaining a protective gas atmosphere over said sealing fluid in said source.

4. The sealed joint as claimed in claim 1, which further comprises means for heating said supply line.

5. The sealed joint as claimed in claim 1, which further comprises means for heat-insulating said supply line.

6. The sealed joint as claimed in claim 1, which further comprises means for heating said gap between said cooling means.

7. The sealed joint as claimed in claim 1, which further comprises means for heat-insulating said gap between said cooling means.

8. The sealed joint as claimed in claim 1, in which said supply line is connected to a reservoir and expansion vessel constituting said source for said liquid-sealing fluid.

9. The sealed joint as claimed in claim 8, which further comprises means for heating said reservoir and expansion vessel.

10. The sealed joint as claimed in claim 8, which further comprises means for heat-insulating said reservoir and expansion vessel.

11. The sealed joint as claimed in claim 1, in which said housing is defined by a guide bushing and said movable machine element by a valve stem.

12. The sealed joint as claimed in claim 1, in which said movable machine element is at least as large in diameter in said gap as outside said gap.

13. The sealed joint as claimed in claim 1, in which said movable machine element is hollow in said gap.

14. The sealed joint as claimed in claim 13, in which said movable machine element is filled with heat-insulating material in said gap.

15. The sealed joint as claimed in claim 13, in which said movable machine element is filled with heat-conducting material in said gap.

16. The sealed joint as claimed in claim 1, in which said housing is permanently connected to a hollow body containing an operating fluid.

17. The sealed gap as claimed in claim 1, in which said housing communicates with a container holding an operating fluid and said operating fluid is different from said sealing fluid and adapted to contact the same and is adequately compatible therewith under the conditions prevailing at the point of contact in operation.